(12) United States Patent
Gotou et al.

(10) Patent No.: US 9,304,022 B2
(45) Date of Patent: Apr. 5, 2016

(54) FLOW RATE MEASURING DEVICE

(71) Applicant: Panasonic Intellectual Property Management Co., Ltd., Osaka-shi, Osaka (JP)

(72) Inventors: Hirokazu Gotou, Shiga (JP); Yuji Nakabayashi, Nara (JP); Akihisa Adachi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 14/401,373

(22) PCT Filed: Jul. 2, 2013

(86) PCT No.: PCT/JP2013/004096
§ 371 (c)(1),
(2) Date: Nov. 14, 2014

(87) PCT Pub. No.: WO2014/006881
PCT Pub. Date: Jan. 9, 2014

(65) Prior Publication Data
US 2015/0135850 A1 May 21, 2015

(30) Foreign Application Priority Data
Jul. 6, 2012 (JP) ................................. 2012-152462

(51) Int. Cl.
*G01F 1/66* (2006.01)
(52) U.S. Cl.
CPC . *G01F 1/66* (2013.01); *G01F 1/667* (2013.01)
(58) Field of Classification Search
CPC .............. G01F 1/66; G01F 17/00; G01F 7/00
USPC ........................ 73/861.28, 861.27; 702/51, 48
See application file for complete search history.

(56) References Cited

U.S. PATENT DOCUMENTS 4,509,372 A * 4/1985 Mount .................... G01F 1/668
73/861.28

(Continued)

FOREIGN PATENT DOCUMENTS

JP 2003-106882 A 4/2003
JP 2005-257359 A 9/2005

(Continued)

OTHER PUBLICATIONS

Extended European Search Report in European Application No. 13813939.9, dated Aug. 5, 2015, 7 pages.

(Continued)

*Primary Examiner* — Jewel V Thompson
(74) *Attorney, Agent, or Firm* — Brinks Gilson & Lione

(57) ABSTRACT

To measure the propagation time of an ultrasonic signal, the flow rate measuring device of the present invention has amplifier for amplifying a received signal, reference-voltage changing part, reference-voltage setting part, and reference comparator for comparing between the received signal waveform and reference voltage. Reference-voltage changing part changes the reference voltage according to the amplification degree of the amplified waveform of the received signal in amplifier. Comparing the changed reference voltage with the received signal waveform enhances stability in calculation of the propagation time. This prevents measurement accuracy of the flow velocity and the flow rate of fluid to be measured from degradation.

4 Claims, 7 Drawing Sheets

(56) References Cited

U.S. PATENT DOCUMENTS

| | | | |
|---|---|---|---|
| 6,625,549 B1* | 9/2003 | Nawa | G01F 1/66 702/50 |
| 7,027,936 B2* | 4/2006 | Ploug-Soerensen | G01P 5/245 702/48 |
| 8,489,342 B2* | 7/2013 | Dugger | G01F 1/667 702/45 |
| 8,671,775 B2* | 3/2014 | Gotou | G01F 1/66 73/861.27 |
| 2004/0020307 A1 | 2/2004 | Eguchi et al. | |

FOREIGN PATENT DOCUMENTS

| | | |
|---|---|---|
| JP | 2010-85383 A | 4/2010 |
| JP | 2012-26822 A | 2/2012 |

OTHER PUBLICATIONS

International Search Report, and English language translation thereof, in corresponding International Application No. PCT/JP2013/004096, dated Aug. 27, 2013, 2 pages.

\* cited by examiner

FLOW RATE MEASURING DEVICE

This application is a 371 application of PCT/JP2013/004096 having an international filing date of Jul. 2, 2013, which claims priority to JP 2012-152462 filed Jul. 6, 2012, the entire contents of which are incorporated herein by reference.

TECHNICAL FIELD

The present invention relates to a flow rate measuring device for measuring flow of fluid to be measured, such as water and gas, by using ultrasonic.

BACKGROUND ART

As such a kind of flow rate measuring device, the device to be described below with reference to FIG. 5 is generally known (see patent literature 1, for example). FIG. 5 is a block diagram of a conventional flow rate measuring device.

As shown in FIG. 5, the conventional flow rate measuring device is formed of flow path 21 through which fluid to be measured flows, first ultrasonic transducer 22 and second ultrasonic transducer 23 disposed on flow path 21, switching part 24, transmitter 25, amplifier 26, reference comparator 27, determining part 28, timer 29, and controller 30.

Switching part 24 switches transmission/reception between first ultrasonic transducer 22 and second ultrasonic transducer 23. Transmitter 25 drives first ultrasonic transducer 22 and second ultrasonic transducer 23. Amplifier 26 amplifies a received signal, which is received by the receiver-side transducer (i.e., either first ultrasonic transducer 22 or second ultrasonic transducer 23) and is passed through switching part 24, to predetermined amplitude. Reference comparator 27 compares the voltage of the received signal amplified by amplifier 26 with reference voltage.

Determining part 28 will be described below with reference to FIG. 6. Receiving the result of comparison between received signal A amplified by amplifier 26 and reference voltage from reference comparator 27, determining part 28 detects zero cross point a of received signal A immediately after received signal A exceeds the reference voltage. According to the detection timing by determining part 28, timer 29 measures a propagation time required for transmission/reception of an ultrasonic wave. Controller 30 controls transmitter 25 and amplifier 26; and at the same time, calculates flow velocity v and/or flow rate Q of fluid according to the propagation time measured by timer 29.

Hereinafter, measurement operation of flow rate Q of fluid to be measured with use of a conventional flow rate measuring device will be described with reference to FIG. 5.

First, the flow rate measuring device requests controller 30 to drive transmitter 25 so that transmitter 25 drives first ultrasonic transducer 22 (at the time, first ultrasonic transducer 22 has been switched to the transmitter side by switching part 24). Through the driving operation, an ultrasonic signal transmitted from first ultrasonic transducer 22 travels through the fluid in flow path 21 to second ultrasonic transducer 23. The ultrasonic signal received by second ultrasonic transducer 23 is amplified by amplifier 26 and carried to reference comparator 27 and determining part 28 for signal processing. The ultrasonic signal after signal processing is fed into timer 29.

Next, after switching part 24 switches the transmitter/receiver side between first ultrasonic transducer 22 and second ultrasonic transducer 23, the aforementioned procedures are performed in a similar manner.

Through the procedures above, timer 29 measures each propagation time in the fluid flowing from the upstream to the downstream (as a direction of the forward flow) and in the fluid flowing from the downstream to the upstream (as a direction of the backward flow).

Through the measurement above, flow velocity v of the fluid is obtained and flow rate Q is calculated by expression 1 below:

$$Q = S \cdot v = S \cdot L/2 \cdot \cos\phi(n/t1 - n/t2) \quad \text{(expression 1)},$$

where, L represents an effective distance between first ultrasonic transducer 22 and second ultrasonic transducer 23 in the flowing direction; t1 represents a propagation time in the forward flow; t2 represents a propagation time in the backward flow, v represents a flow velocity of the fluid; S represents a sectional area of flow path 21; $\phi$ represents a sensor angle; and Q represents a flow rate. Sensor angle $\phi$ is the angle (in FIG. 5) formed between the single-lined arrow (indicating the traveling path of the ultrasonic wave between first ultrasonic transducer 22 and second ultrasonic transducer 23) and the outlined arrow (indicating the flowing direction of the fluid in flow path 21).

Practically, flow rate Q is obtained by further multiplying expression 1 by a coefficient suitable for flow rate Q.

In the process above, controller 30 adjusts the gain (i.e., the amplification degree) of amplifier 26 so that the amplitude of the signal received by the receiver-side ultrasonic transducer—either first ultrasonic transducer 22 or second ultrasonic transducer 23—keeps a constant level. This allows the maximum voltage of the received signal to be within a predetermined voltage range.

Hereinafter, a general method of adjusting amplification degree for an ultrasonic signal will be described with reference to FIG. 7.

FIG. 7 illustrates a generally used method of adjusting amplification degree in a flow rate measuring device.

As shown in FIG. 7, during the measurement of an ultrasonic signal, when the maximum voltage of received signal b (shown by a dotted line) becomes lower than the lower limit of the predetermined voltage range, the gain (amplification degree) is adjusted so that the maximum voltage of the received signal increases and gets into the predetermined voltage range in the next flow rate measurement.

Similarly, when the maximum voltage of received signal c (also shown by a dotted line in FIG. 7) becomes higher than the higher limit of the predetermined voltage range, the gain (amplification degree) is adjusted so that the maximum voltage of the received signal decreases and gets into the predetermined voltage range in the next flow rate measurement.

To be specific, when the maximum voltage of the received signal falls below the lower limit, the amplification degree is increased so that the maximum voltage takes a value between the higher limit and the lower limit of the voltage range, just like received signal a shown by a solid line in FIG. 7. Similarly, when the maximum voltage of the received signal exceeds the higher limit, the amplification degree is decreased so that the maximum voltage takes a value between the higher limit and the lower limit of the voltage range, just like received signal a.

In this way, the amplification degree of a detected ultrasonic signal is adjusted by the method above.

The reference voltage of reference comparator 27, which is to be compared with the received signal amplified by amplifier 26, is used to determine the position of a zero cross point detected by determining part 28.

The reference voltage for determining a zero cross point will be described below with reference to FIG. 6.

FIG. 6 shows an example of operation for determining zero cross point a from a received signal in a conventional flow rate measuring device.

As shown in FIG. 6, for example, the reference voltage is set to the center point of the difference between the positive peak voltage of the third waveform and the positive peak voltage of the fourth waveform of the wave of the received signal that travels in the air flowing in flow path 21. By virtue of the setting above, even when the peak voltage of the third waveform of the received signal increases or when the peak voltage of the fourth waveform decreases due some reason, the reference voltage has a margin with respect to each peak voltage. This enables determining part 28 to have a stable detection of zero cross point a of the fourth waveform.

However, according to a conventional flow rate measuring device, the reference voltage is set to a fixed value. That is, as shown in FIG. 6, to obtain a stable detection of zero cross point a, the reference voltage is set to a fixed value that corresponds to the center point of the peak voltages having the largest interval therebetween of the received signal traveling in the air, i.e., between the third waveform and the fourth waveform of the wave. Therefore, if the fluid to be measured is changed from air to other gases, the waveform of a received signal depends on the types of gas and it can largely change from the waveform of the received signal traveling in the air (FIG. 6).

As a result, if the peak voltage of the third waveform of a received signal increases largely and exceeds the reference voltage, the zero cross point of the third waveform is wrongly detected as zero cross point a. Similarly, if the peak voltage of the fourth waveform of a received signal largely decreases to a value smaller than the reference voltage, the zero cross point of the fifth waveform is wrongly detected as zero cross point a.

That is, according to the conventional flow rate measuring device, the reference voltage is set in advance to the center point between the peak voltage of the third waveform and the peak voltage of the fourth waveform of a received signal traveling in the air. With the structure above, when the fluid to be measured is air or when the fluid to be measured is a gas that has a small change in the waveform of the received signal from the waveform in the case of air, the conventional device offers stable detection of the zero cross point of the fourth waveform and therefore provides flow rate measurement with high accuracy.

However, if the fluid to be measured is a gas that has a big change in the waveform of the received signal from in the case of air, the detection point for detecting a propagation time has variation—as described above, the device may wrongly detect the zero cross point of the third waveform or the fifth waveform—and therefore the measurement of the propagation time has poor accuracy. Further, the problem above causes poor accuracy in calculation value of flow rate of fluid to be measured.

CITATION LIST

Patent Literature

PTL 1
Japanese Unexamined Patent Application Publication No. 2003-106882

SUMMARY OF THE INVENTION

To address the problem above, the flow rate measuring device of the present invention has a first transducer and a second transducer disposed in the flow path through which fluid to be measured flows, and for transmitting/receiving an ultrasonic signal; a transmitter for driving the first and the second transducers; a switching part for switching transmission/reception between the first and the second transducers; an amplifier for amplifying the signal received by the first and the second transducers; and a reference comparator for comparing between the output from the amplifier and reference voltage. Besides, the device contains a reference-voltage setting part for setting the reference voltage to be used for comparison in the reference comparator; a determining part for determining the arrival time of an ultrasonic signal based on an output of the reference comparator and the output of the amplifier; a timer for calculating the propagation time from the transmission to the reception of the ultrasonic signal based on the arrival time determined by the determining part; a controller for calculating at least one of the flow velocity and the flow rate of fluid to be measured according to the time calculated by the timer; and a reference-voltage changing part for changing the reference voltage to be set in the reference-voltage setting part according to the amplification degree in the amplifier.

With the structure above, the device can measure a predetermined zero cross point (for example, the zero cross point of the fourth waveform) with stability for various types of gas by changing reference voltage according to amplification degree of the amplifier; and accordingly, it provides measurement of the propagation time of ultrasonic signals with stability. That is, the structure above offers a flow rate measuring device capable of preventing measurement accuracy of the flow velocity and the flow rate of fluid to be measured from degradation.

DETAILED DESCRIPTION OF THE PREFERRED EMBODIMENTS

Hereinafter, an exemplary embodiment of the present invention will be described with reference to accompanying drawings. It is to be understood that the present invention is not limited to the structure described in the exemplary embodiment.

First Exemplary Embodiment

Figure 1:
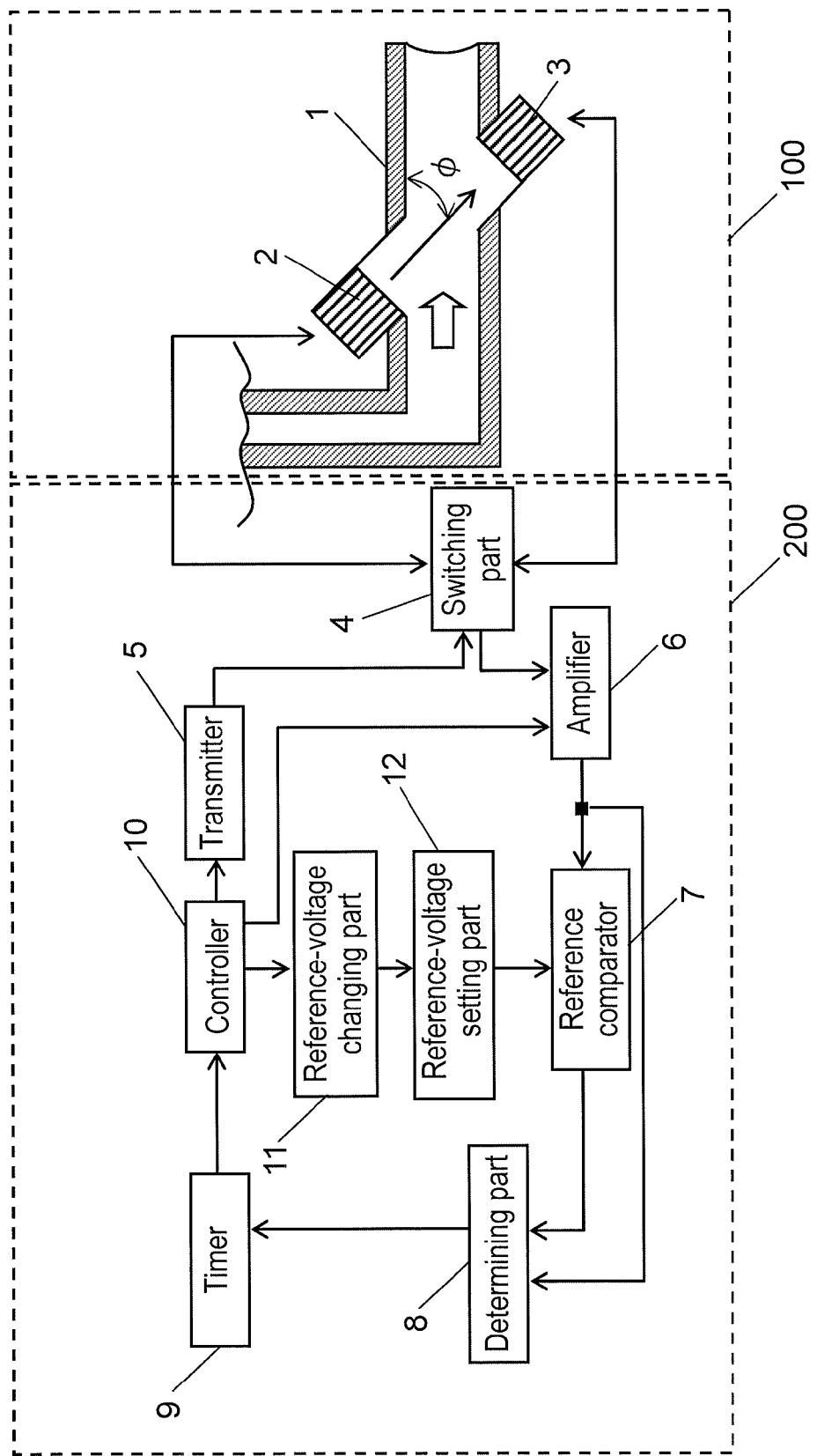
FIG. 1 is a block diagram of a flow rate measuring device in accordance with a first exemplary embodiment of the present invention.
Figure 2:
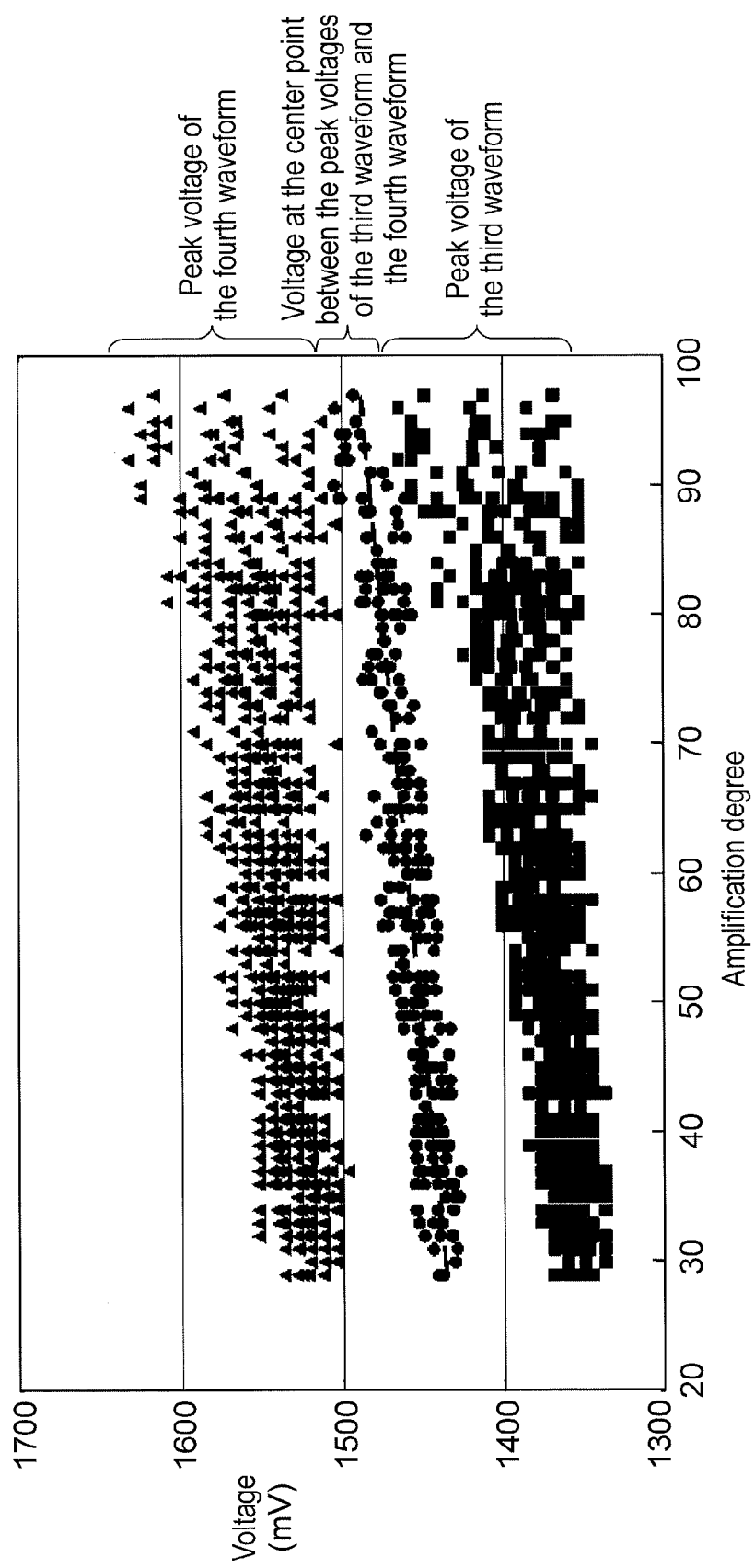
FIG. 2 shows a measurement result of distribution of the peak voltage of the third waveform and the fourth waveform of the amplified wave, reference voltage determined to the center point between the aforementioned peak voltage values, and amplification degree when various types of gas are measured by two-or-more flow rate measuring devices.
Figure 3:
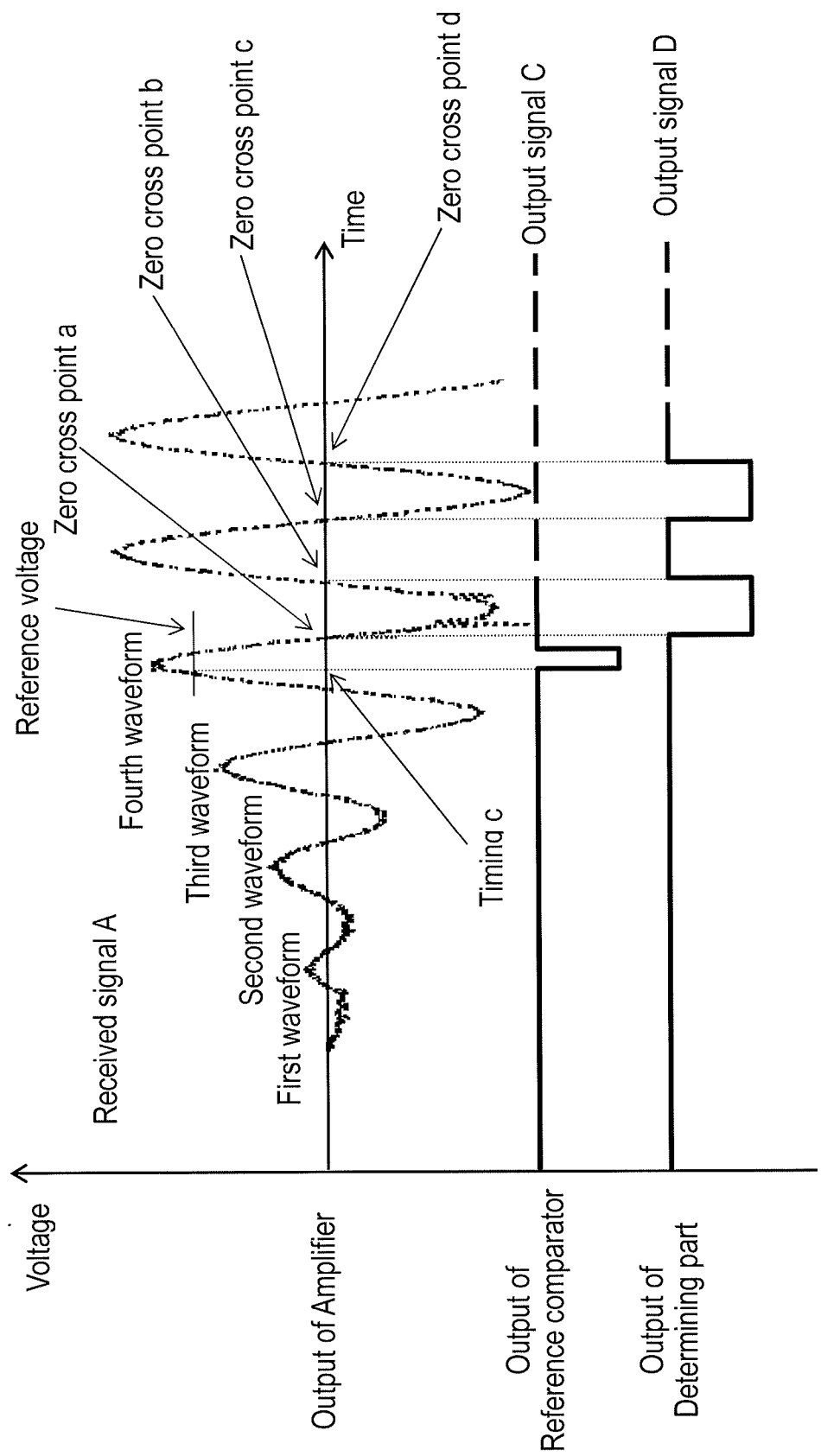
FIG. 3 shows an example for determining zero cross point a from a received signal in the flow rate measuring device in accordance with the first exemplary embodiment.

Hereinafter, a flow rate measuring device of the first exemplary embodiment of the present invention will be described with reference to FIG. 1 through FIG. 3. FIG. 1 is a block diagram of a flow rate measuring device in accordance with the first exemplary embodiment of the present invention. FIG. 2 shows a measurement result of distribution of the peak voltage of the third waveform and the fourth waveform of the amplified wave, reference voltage determined to the center point between the aforementioned peak voltage values, and amplification degree when various types of gas are measured by two-or-more flow rate measuring devices. FIG. 3 shows an example for determining zero cross point a from a received signal in the flow rate measuring device in accordance with the first exemplary embodiment.

As shown in FIG. 1, the flow rate measuring device of the exemplary embodiment is formed of at least measurement section 100 and calculation section 200.

Measurement section 100 of the flow rate measuring device has flow path 1 through which fluid to be measured flows, and first ultrasonic transducer 2 (hereinafter referred to first transducer 2) and second ultrasonic transducer 3 (hereinafter, second transducer 3) both of which are disposed on flow path 1. Ultrasonic signals are transmitted/received by first transducer 2 (or second transducer 3) and received/transmitted by second transducer 3 (or first transducer 2). The transducers are disposed in spaced relation to each other on flow path 1 so that first transducer 2 faces second transducer 3 at predetermined sensor angle $\phi$.

Calculation section 200 of the flow rate measuring device is formed at least switching part 4, transmitter 5, amplifier 6, reference comparator 7, determining part 8, timer 9, controller 10, reference-voltage changing part 11, and reference-voltage setting part 12.

Transmitter 5 drives a transducer determined as the transmitter side (of any one of first transducer 2 and second transducer 3). Switching part 4 switches transmission/reception between first transducer 2 and second transducer 3. Amplifier 6 amplifies an ultrasonic signal received by the receiver-side transducer (of any one of first transducer 2 and second transducer 3) with an amplification degree according to the instruction from controller 10. Reference comparator 7 compares the received signal amplified by amplifier 6 with reference voltage and outputs a signal based on the comparison result to determining part 8.

Receiving the output signal from reference comparator 7 and the received signal amplified in amplifier 6, determining part 8 determines the arrival time of the ultrasonic signal. Based on the arrival time of the ultrasonic signal determined by determining part 8, timer 9 calculates the propagation time of the ultrasonic signal from the transmitter-side transducer to the receiver-side transducer. Receiving the propagation time calculated by timer 9, controller 10 calculates flow velocity v and flow rate Q of fluid to be measured. Besides, controller 10 controls transmitter 5 and amplifier 6.

According to the amplification degree requested from controller 10 to amplifier 6, reference-voltage changing part 11 changes reference voltage so as to be a linear function of the amplification degree. Receiving the reference voltage changed in reference-voltage changing part 11, reference-voltage setting part 12 sends it as a set voltage to reference comparator 7.

The flow rate measuring device of the exemplary embodiment has the aforementioned structure.

Hereinafter, the workings of measuring flow velocity v and flow rate Q of fluid to be measured in the flow rate measuring device of the exemplary embodiment will be described with reference to FIG. 1 and FIG. 3.

Figure 7:
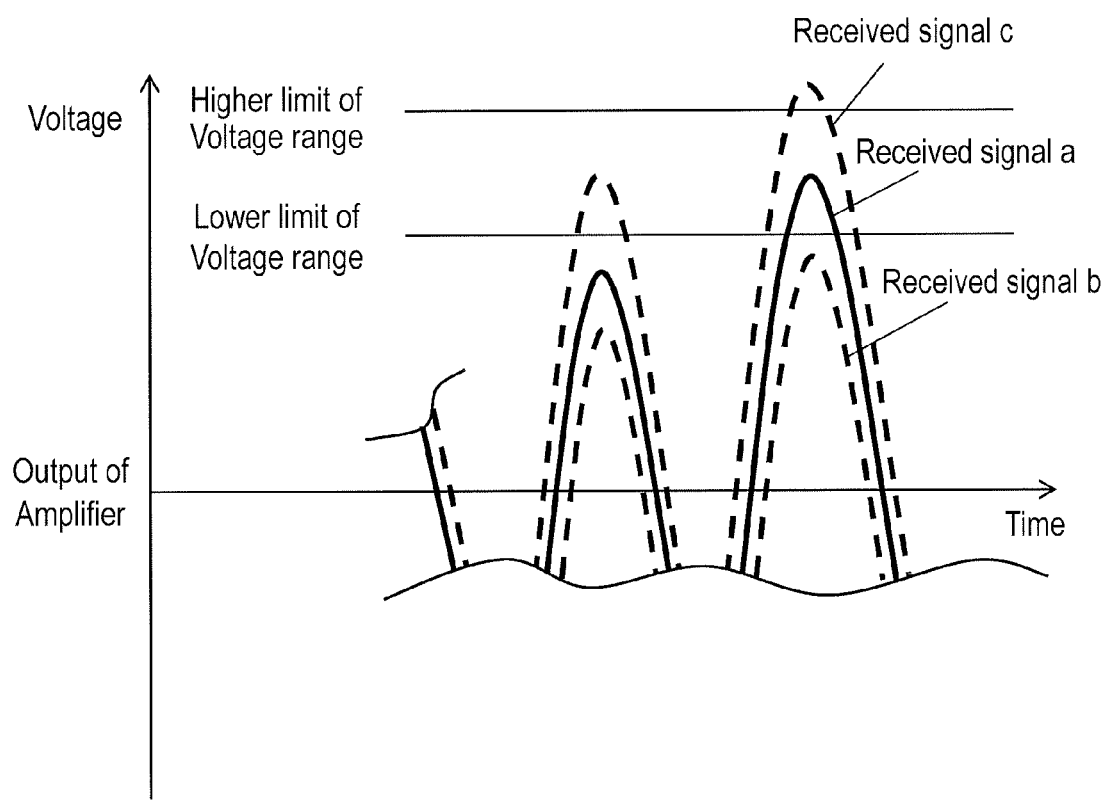
FIG. 7 illustrates a generally employed method for adjusting amplification degree in a flow rate measuring device.

According to the flow rate measuring device of the exemplary embodiment, controller 10 adjusts the amplification degree of amplifier 6 so that the waveform of the received signal after amplification has constant amplitude. The amplification degree is adjusted by the method described above with reference to FIG. 7.

In response to the start of flow rate measurement of fluid (to be measured) flowing through flow path 1, controller 10 drives transmitter 5 so that first transducer 2 (suppose that, for example, it is switched to the transmitter side by switching part 4) transmits an ultrasonic signal to second transducer 3. Timer 9 starts working from the moment at which the ultrasonic signal is transmitted from first transducer 2.

The ultrasonic signal is received by second transducer 3 and then amplified by amplifier 6 with use of amplification degree adjusted by controller 10. The amplified signal is fed into reference comparator 7 and determining part 8. Reference comparator 7 compares the received signal with the reference voltage (that is set to a value located at the center point between the peak voltage of the third waveform and the peak voltage of the fourth waveform of the wave shown in FIG. 3) and outputs a signal based on the comparison result to determining part 8.

As shown in FIG. 3, upon the output of the signal (see output signal C) from reference comparator 7 (corresponding to timing c in FIG. 3), determining part 8 starts working.

Timer 9 calculates the propagation time of the ultrasonic signal from the moment at which determining part 8 starts working to the moment at which determining part 8 detects the first zero cross point (i.e., zero cross point a in FIG. 3) where the sign of output from amplifier 6 changes from positive to negative.

After the detection of zero cross point a (see output signal D) by determining part 8, switching part 4 switches the transmitter/receiver side between first transducer 2 and second transducer 3. To be specific, second transducer 3 is switched into the transmitter side, and first transducer 2 is switched into the receiver side.

After switching, the propagation time of the ultrasonic signal is similarly measured (where, the ultrasonic signal is transmitted from second transducer 3 and received by first transducer 2).

Through the procedures above, the first-time operation of a series of operations—in which the flow velocity and the flow rate of fluid (to be measured) flowing through flow path 1 are measured—is completed.

After that, the series of operations are repeated for predetermined number of times, which improves measurement accuracy. The predetermined number of times is not limited to a specific number.

While the operations are being performed, each of the propagation time of an ultrasonic signal transmitted from first transducer 2 and the propagation time of an ultrasonic signal transmitted from second transducer 3 is separately accumulated by the predetermined (repeating) number of times.

After the measurement of the propagation time for the predetermined repeating number of times, controller 10 calculates, from each accumulated propagation time, the propagation time of the ultrasonic signal of each case (i.e., in the case where the signal is transmitted from first transducer 2 and in the case where the signal is transmitted from second transducer 3). Further, based on the calculated propagation time, controller 10 calculates flow velocity v and flow rate Q of the fluid.

According to the exemplary embodiment, in the measurement above, reference-voltage changing part 11 calculates the reference voltage to be used for comparison in reference comparator 7 so that the value of the reference voltage is to be a linear function of the amplification degree employed in amplifier 6. Reference-voltage setting part 12 transmits the calculated reference voltage to reference comparator 7 so as to be set and stored therein as newly set reference voltage used for the next-time measurement.

With the structure above, the flow rate measuring device of the exemplary embodiment calculates flow velocity v and flow rate Q of fluid to be measured.

Hereinafter, the relation between the amplification degree and the waveform of the received ultrasonic signal—where, various types of gas are used for the fluid to be measured and the measurement is performed by two-or-more flow rate measuring devices—will be described with reference to FIG. 2.

FIG. 2 shows a measurement result of distribution of the peak voltage of the third waveform and the fourth waveform of the amplified wave, reference voltage determined to the center point between the aforementioned peak voltage values, and amplification degree when various types of gas are measured by two-or-more flow rate measuring devices. The measurement result of FIG. 2 is obtained by the flow rate measuring devices of the exemplary embodiment.

As shown in FIG. 2, the attenuation degree of the waveform of the received ultrasonic signal varies with the types of gas; accordingly, the amplitude of the received signal fed from the receiver-side transducer of any one of first transducer 2 and second transducer 3 varies with the types of gas to be measured. Therefore, amplifier 6 uses different amplification degree so as to be suitable for each gas to be measured.

Besides, as described above, the conventional flow rate measuring device amplifies the received ultrasonic signal so that the maximum amplitude of the waveform of the signal is maintained constant. However, as shown in FIG. 2, the waveform of the received ultrasonic signal has a gradual change with the amplification degree. That is, it will be understood from FIG. 2 that, with increase in amplification degree, the peak voltage of the third waveform, the peak voltage of the fourth waveform, and the reference voltage set to the center point therebetween gradually become higher in the form of linear functions, i.e., (substantially) linearly.

FIG. 2 also shows that the distribution of the peak voltage of the third waveform, the peak voltage of the fourth waveform, and the reference voltage set to the center point therebetween has variations with respect to each amplification degree, for example, due to device-to-device variation in the flow rate measuring devices.

According to the flow rate measuring device of the exemplary embodiment, however, reference-voltage changing part 11 changes the reference voltage so as to be a linear function of the amplification degree. This allows the reference voltage to consistently locate to the center point between the peak voltage of the third waveform and the peak voltage of the fourth waveform with respect to gases having difference in amplification degree.

With the structure above, the flow rate measuring device consistently measures the zero cross point of the fourth waveform, calculating the propagation time of the ultrasonic signal with stability. As a result, the flow rate measuring device prevents measurement accuracy of the flow velocity and the flow rate from degradation.

The description of the exemplary embodiment shows an example in which the propagation time of the ultrasonic signal is calculated from zero cross point a detected as the zero cross point of the fourth waveform shown in FIG. 3, but it is not limited to; for example, calculation with use of zero cross point b of the fifth waveform of FIG. 3 is also effective in measuring the propagation time.

Besides, the description of the exemplary embodiment shows an example in which the measurement of the propagation time is calculated by detecting a single zero cross point (i.e., zero cross point a only), but it is not limited to. Calculation with use of two-or-more zero cross points (for example, zero cross points a, b, c, and d shown in FIG. 3) is similarly effective in measuring the propagation time.

Second Exemplary Embodiment

Hereinafter, a flow rate measuring device of the second exemplary embodiment of the present invention is described with reference to FIG. 4.

Figure 4:
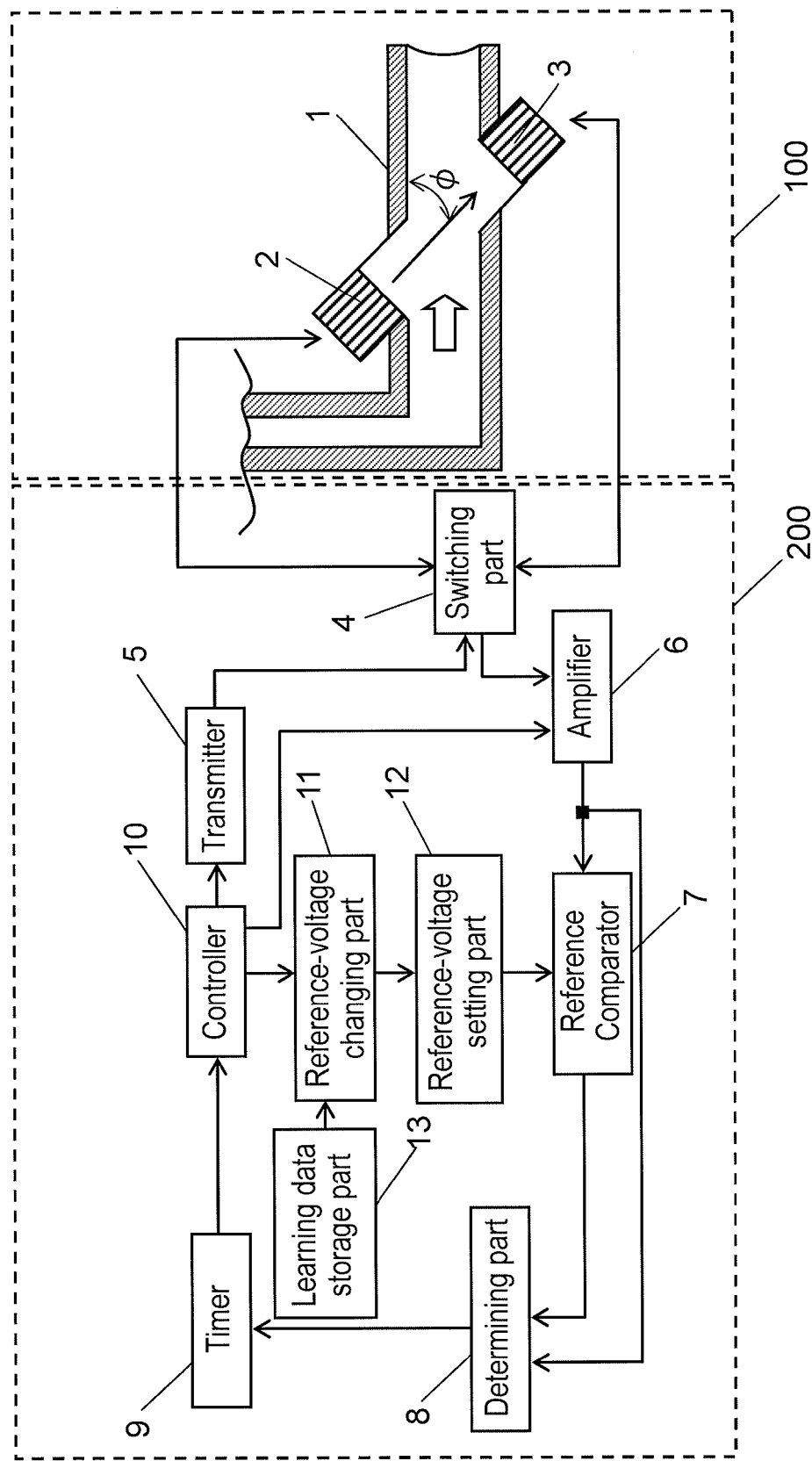
FIG. 4 is a block diagram of a flow rate measuring device in accordance with a second exemplary embodiment of the present invention.
Figure 5:
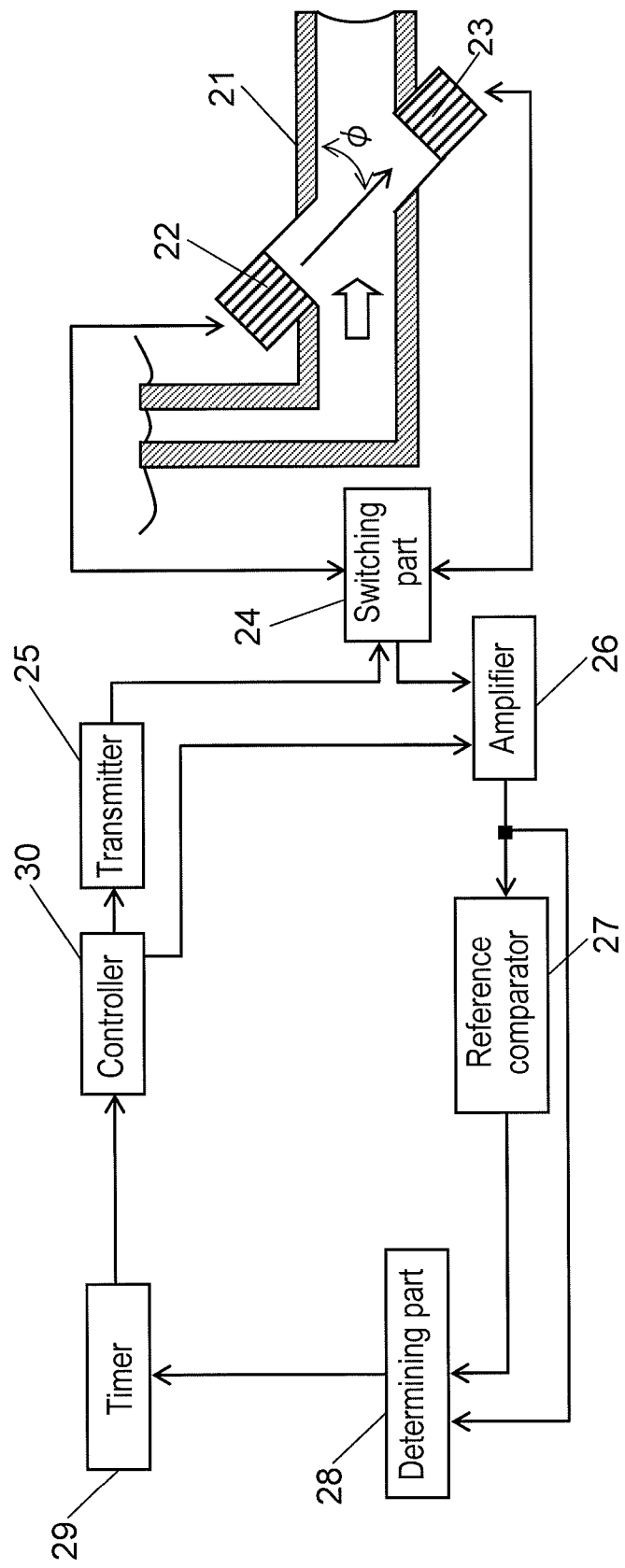
FIG. 5 is a block diagram of a conventional flow rate measuring device.
Figure 6:
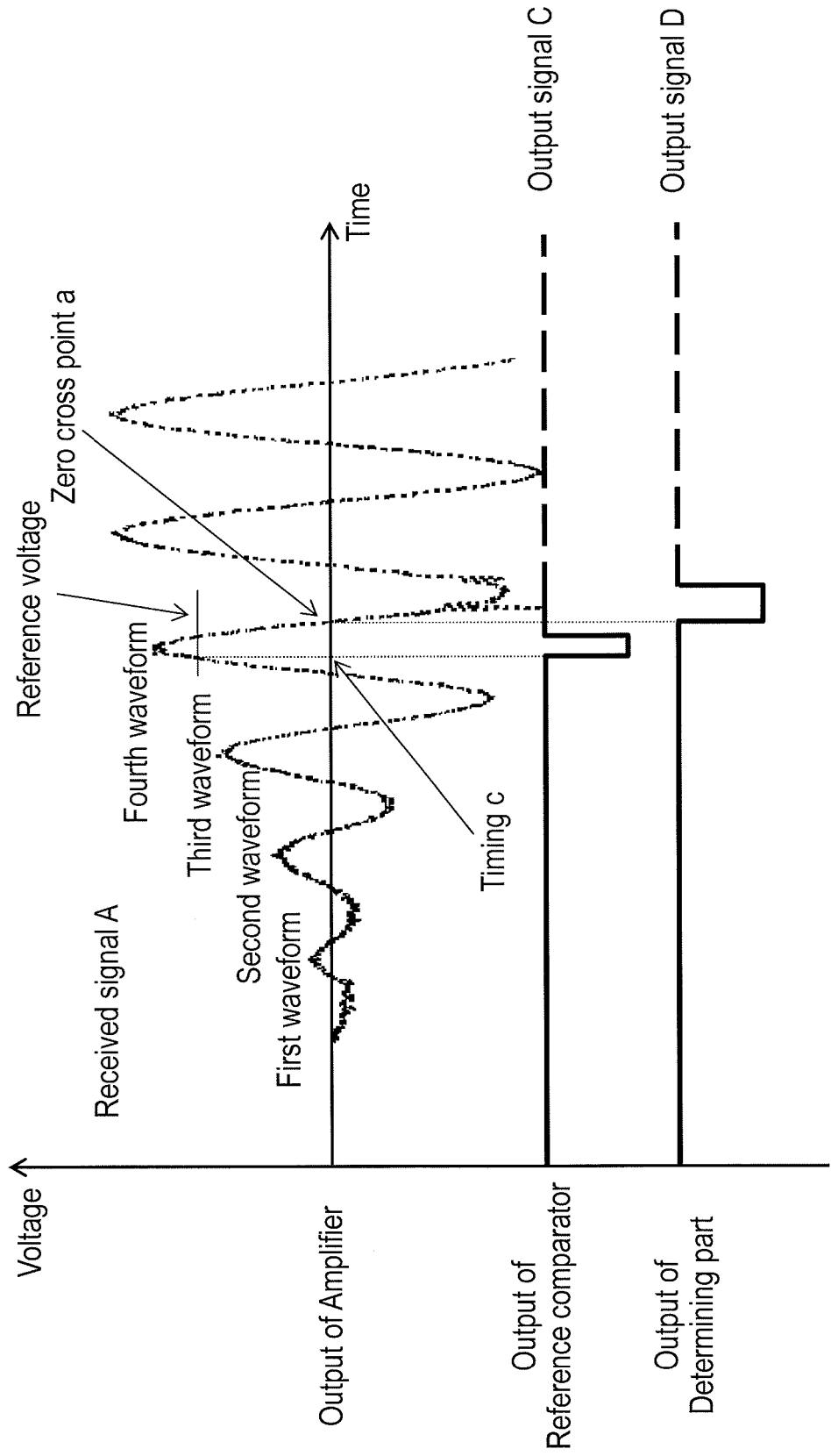
FIG. 6 shows an example for determining zero cross point a from a received signal in the conventional flow rate measuring device.

FIG. 4 is a block diagram of the flow rate measuring device of the second exemplary embodiment.

As shown in FIG. 4, the flow rate measuring device of the second exemplary embodiment differs from the structure of the first exemplary embodiment in further having learned data storage part 13. The rest of the structure and workings are similar to those of the first exemplary embodiment and therefore detailed description will be omitted.

First, the flow rate measuring device of the exemplary embodiment learns reference voltage obtained from the waveform of the received ultrasonic signal. In the measurement, a standard gas such as air is employed for fluid to be measured for each measuring device. The learned data (for example, learned amplification degree and learned reference voltage) is stored in learned data storage part 13.

Next, on the basis of the learned data (i.e., learned amplification degree and learned reference voltage) stored in learned data storage part 13, reference-voltage changing part 11 changes the reference voltage of a gas to be measured so as to be a linear function of the amplification degree suitable for the gas. Specifically, first, learned amplification degree and learned reference voltage for a standard gas are calculated. When an amplification degree used for a gas (to be actually measured) is determined, reference-voltage changing part 11 calculates the reference voltage so as to be a linear function of the amplification degree of the gas to be measured. That is, as long as data (i.e., learned amplification and learned reference voltage) specific to a certain flow rate measuring device is obtained for a standard gas, reference voltage of a different type of gas can be easily calculated from the relation of linear function between the reference voltage and the amplification degree.

As described above, according to the flow rate measuring device of the exemplary embodiment, reference-voltage changing part 11 changes the reference voltage so as to be a liner function of the amplification degree. Therefore, even when various types of gas having different amplification degree are used, the device determines, with easy calculation, the reference voltage so that the value thereof is consistently located to the center point between the peak voltage of the third waveform and the peak voltage of the fourth waveform of the wave. That is, the device consistently detects the zero cross point of the fourth waveform of the wave for each gas, providing calculation of the propagation time of the ultrasonic signal with stability. As a result, the flow rate measuring device prevents measurement accuracy of the flow velocity and the flow rate of fluid to be measured from degradation.

In addition, according to the flow rate measuring device, the reference voltage for the standard gas is obtained in advance as learned data for each device, and then the reference voltage is changed on the basis of learned amplification degree and learned reference voltage. This suppresses device-to-device variation in the flow rate measuring devices. As a result, the flow rate measuring device prevents measurement accuracy of the flow velocity and the flow rate of fluid to be measured from degradation.

As described above, the flow rate measuring device of the present invention has a first transducer and a second transducer disposed in the flow path through which fluid to be measured flows, and for transmitting/receiving an ultrasonic signal; a transmitter for driving the first and the second transducers; a switching part for switching transmission/reception between the first and the second transducers; an amplifier for amplifying the signal received by the first and the second transducers; and a reference comparator for comparing between the output from the amplifier and reference voltage. Besides, the device contains a reference-voltage setting part for setting the reference voltage to be used for comparison in the reference comparator; a determining part for determining the arrival time of an ultrasonic signal based on an output of the reference comparator and the output of the amplifier; a timer for calculating the propagation time of the ultrasonic signal based on the arrival time of the ultrasonic signal determined by the determining part; a controller for calculating at least one of the flow velocity and the flow rate of fluid to be measured according to the time calculated by the timer; and a reference-voltage changing part for changing the reference voltage to be set in the reference-voltage setting part. The reference-voltage changing part may change the reference voltage according to the amplification degree employed in the amplifier. With the structure above, the device can measure a predetermined zero cross point (for example, the zero cross point of the fourth waveform of the wave) with stability for various types of gas; and accordingly, it provides measurement of the propagation time of ultrasonic signals with stability. As a result, the structure above offers a flow rate measuring device capable of preventing measurement accuracy of flow velocity and flow rate of fluid to be measured from degradation.

Further, the reference-voltage changing part of the flow rate measuring device of the present invention may change the reference voltage as a linear function of the amplification degree, by which reference voltage for various types of gas is easily calculated. The flow rate measuring device consistently measures the zero cross point of the fourth waveform of the waveform, calculating the propagation time of the ultrasonic signal with stability. As a result, the flow rate measuring device prevents measurement accuracy of the flow velocity and the flow rate from degradation.

The flow rate measuring device of the present invention further contains a learned data storage part. The device learns in advance a reference voltage by using a certain fluid to be measured, and the learned reference voltage and learned amplification degree are stored in the learned data storage part. Based on the learned amplification degree and the learned reference voltage, the reference-voltage changing part may change reference voltage, by which reference voltage for various types of gas is easily calculated. The measuring device consistently measures a predetermined zero cross point (for example, the zero cross point of the fourth waveform of the wave), calculating the propagation time of the ultrasonic signal with stability. Besides, the learning operation of reference voltage is performed in advance for each measuring device, and a reference voltage to be used for measurement is changed on the basis of the learned amplification degree and the learned reference voltage. This suppresses device-to-device variation in the measuring devices. As a result, the flow rate measuring device prevents measurement accuracy of the flow velocity and the flow rate from degradation.

INDUSTRIAL APPLICABILITY

The structure of the present invention measures the propagation time of an ultrasonic signal that travels in fluid (for example, various types of gas) to be measured and provides measurement of the flow velocity and the flow rate of the fluid with high accuracy. The structure is therefore useful for flow rate measuring devices, for example, a measuring device for various types of gas, and a gas meter for domestic use and a large-sized one for business use.

What is claimed is:

1. A flow rate measuring device comprising:
a first transducer and a second transducer disposed in a flow path through which fluid to be measured flows, and for transmitting/receiving an ultrasonic signal;
a transmitter for driving the first transducer and the second transducer;
a switching part for switching transmission/reception between the first transducer and the second transducer;
an amplifier for amplifying a signal received by the first transducer and the second transducer;
a reference comparator for comparing between an output from the amplifier and a reference voltage;
a reference-voltage setting part for setting the reference voltage to be used for comparison in the reference comparator;
a determining part for determining an arrival time of the ultrasonic signal based on an output of the reference comparator and the output of the amplifier;
a timer for calculating a propagation time from the transmission to the reception of the ultrasonic signal based on the arrival time determined by the determining part;
a controller for calculating at least one of a flow velocity and a flow rate of the fluid to be measured according to the propagation time calculated by the timer; and
a reference-voltage changing part for changing the reference voltage to be set in the reference-voltage setting part,
wherein the reference-voltage changing part changes the reference voltage according to an amplification degree employed in the amplifier.

2. The flow rate measuring device of claim 1, wherein the reference-voltage changing part changes the reference voltage as a linear function of the amplification degree.

3. The flow rate measuring device of claim 1, wherein the reference-voltage changing part further contains a learned data storage part that learns, in advance, a reference voltage by using a certain fluid to be measured and stores a learned amplification degree and a learned reference voltage so that the reference-voltage changing part changes the reference voltage with reference to the learned amplification degree and the learned reference voltage.

4. The flow rate measuring device of claim 2, wherein the reference-voltage changing part further contains a learned data storage part that learns, in advance, a reference voltage by using a certain fluid to be measured and stores a learned amplification degree and a learned reference voltage so that the reference-voltage changing part changes the reference voltage with reference to the learned amplification degree and the learned reference voltage.

* * * * *